United States Patent [19]

Stewart

[11] 4,164,782
[45] Aug. 14, 1979

[54] LOCKING MECHANISM FOR RECORD PACKAGE

[75] Inventor: Myron C. Stewart, Indianapolis, Ind.

[73] Assignee: RCA Corporation, New York, N.Y.

[21] Appl. No.: 935,303

[22] Filed: Aug. 21, 1978

[51] Int. Cl.² .................... G11B 5/82; G11B 25/04
[52] U.S. Cl. ................................. 360/133; 206/444; 360/97
[58] Field of Search ............... 360/133, 135, 97–99, 360/86; 206/444, 312, 309; 358/128; 274/9 B

[56] References Cited

U.S. PATENT DOCUMENTS

| | | | |
|---|---|---|---|
| 3,662,360 | 5/1972 | Lambert | 360/133 |
| 3,951,264 | 4/1976 | Heidecker et al. | 206/309 |
| 3,959,823 | 5/1976 | Heidecker et al. | 360/99 |
| 4,133,540 | 1/1979 | Torrington | 274/9 B |
| 4,138,703 | 2/1979 | Stave et al. | 360/133 |

Primary Examiner—Alfred H. Eddleman
Attorney, Agent, or Firm—Eugene M. Whitacre; Joseph S. Tripoli; Dilip A. Kulkarni

[57] ABSTRACT

A record cover comprises a jacket and a record retaining tray removably received within the jacket. A cover latching mechanism locks the tray to the jacket to prevent indiscriminate access to the enclosed record. When a record occupied cover is inserted into the player, unlocking members provided in the player defeat the latching mechanism for allowing separation of the tray from the jacket during subsequent jacket withdrawal to cause retention of the enclosed record in the player for playback.

4 Claims, 15 Drawing Figures

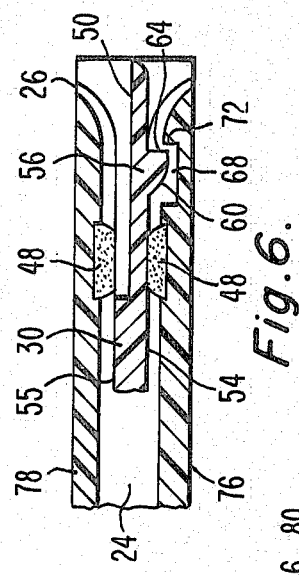
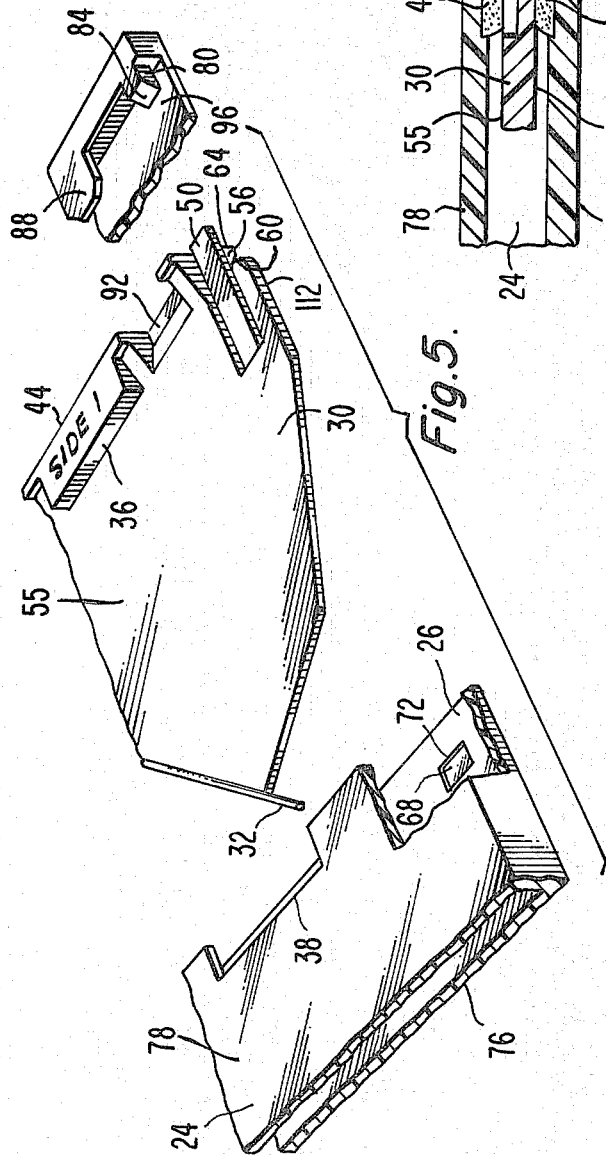
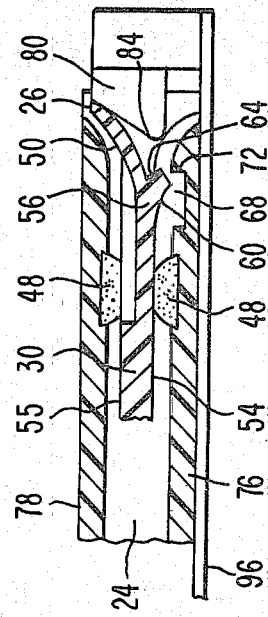

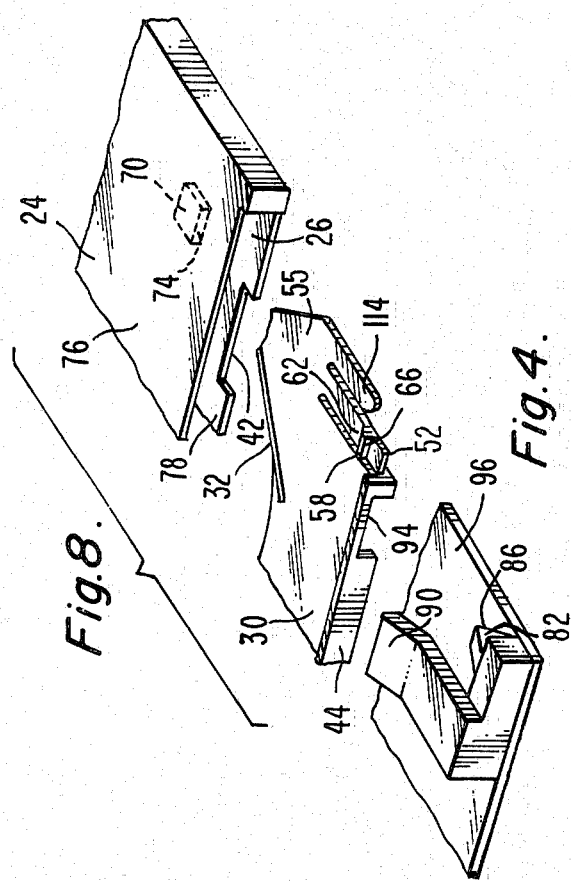
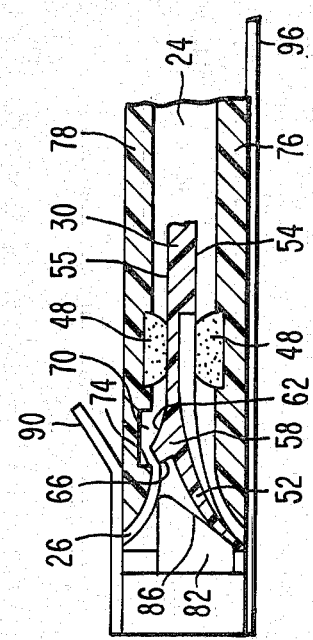
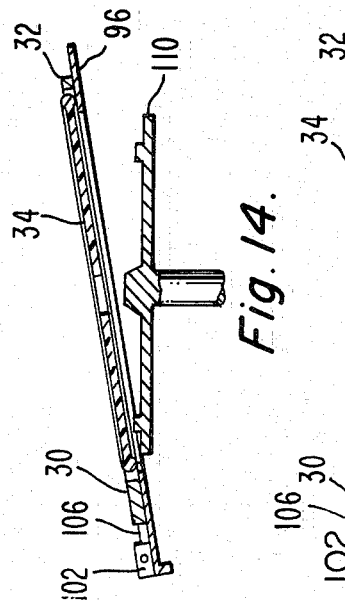
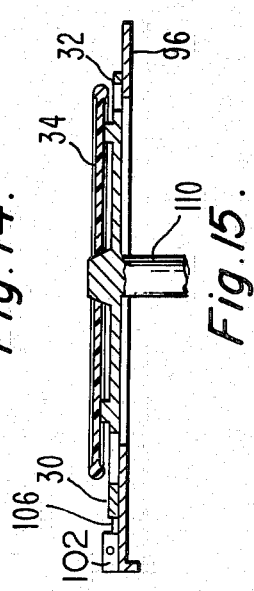
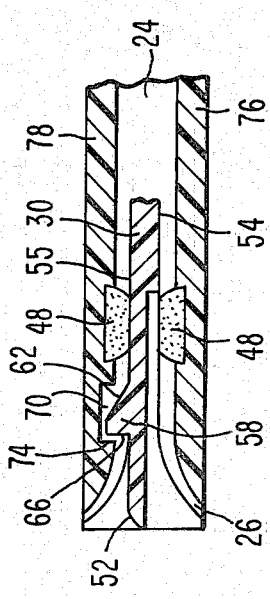

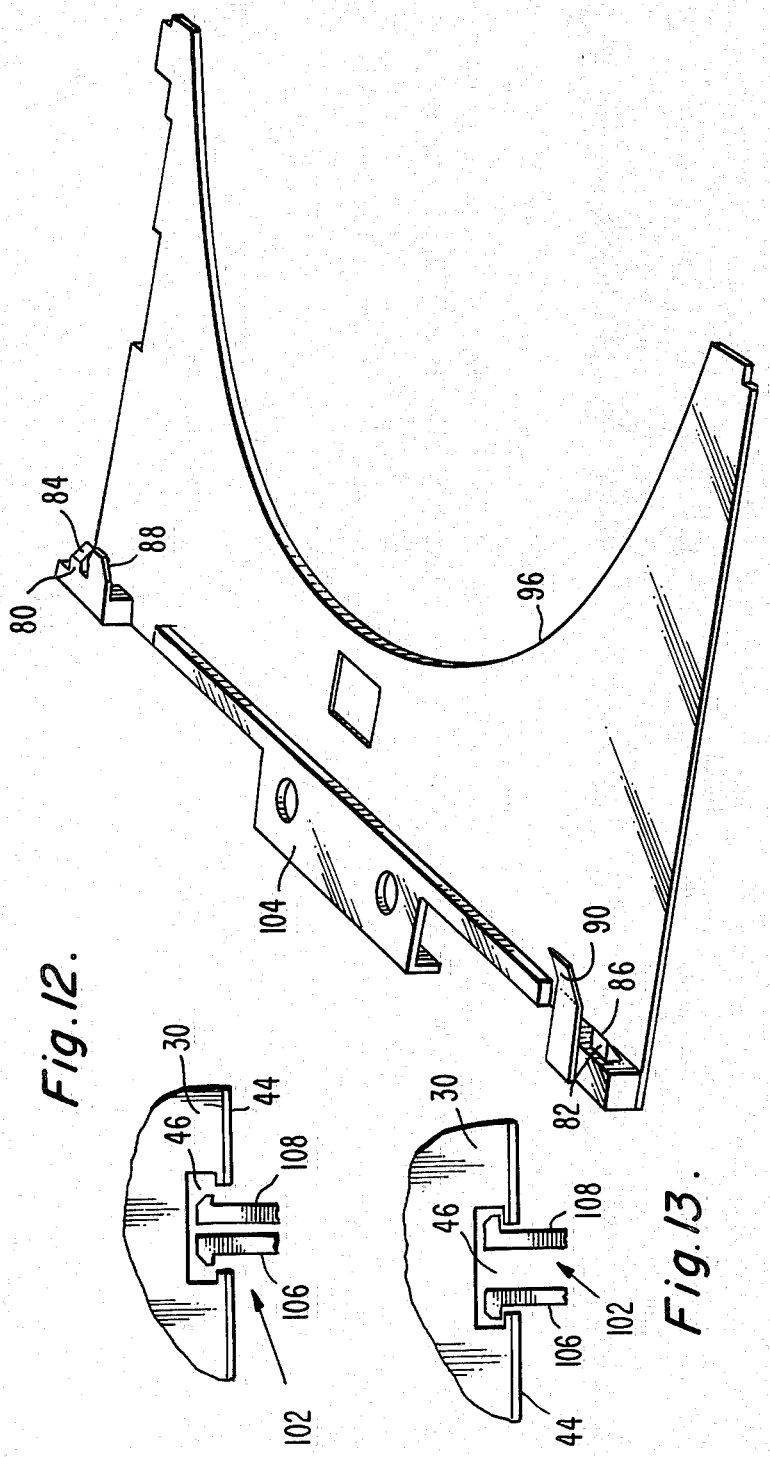

LOCKING MECHANISM FOR RECORD PACKAGE

The present invention generally relates to protective packages for video disc records, and more particularly, it relates to locking mechanisms for video disc packages.

In systems involving high density information records, such as video discs, it has been found desirable to provide a package/player combination wherein a record is inserted into, and removed from, the player while it remains enclosed in its package. U.S. patent appications, Ser. Nos. 801,603 and 801,604, now U.S. Pat. No. 4,133,540, concurrently filed on behalf of L. A. Torrington on May 31, 1977 illustrate, respectively, a record package and a player-mounted, package handling mechanism, which eliminate manual handling of the record. The aforesaid Torrington patent applications are assigned to the assignee of the subject application. In the therein disclosed system, the package includes a jacket which has an edge opening in communication with a record enclosing cavity. A record retainer (or tray) is removably received within the jacket. The record retainer has an opening for receiving a disc record, and it has a portion which cooperates with the edge opening of the jacket to form a substantially sealed record enclosing cavity.

When an occupied jacket is inserted into the player, a record extracting apparatus provided in the player grasps the record retainer, so that the retainer and the enclosed record are removed from the jacket during subsequent jacket withdrawal. A platform is disposed in the player to support the removed record, which is transferred to the turntable for playback when the platform is depressed. To retrieve the record, an empty jacket is reinserted into the player.

In the above-mentioned type systems, it is desirable to prevent the enclosed record from accidentally falling out of its protective package, and it is also desirable to deter indiscriminate access to the enclosed record.

Pursuant to the present invention, a retainer/jacket locking mechanism is provided. The record retainer is provided with an integrally molded, flexural locking member with a free end which is subject to deflection in a direction at right angles to the major surface of the retainer. A protruding tab is disposed on the flexural locking member near the free end thereof. The protruding tab has an obtusely disposed edge remote from the free end of th flexural locking member, such that the engagement of the obtusely disposed edge and an interior surface of the jacket causes deflection of the flexural locking member to permit insertion of the record retainer into the jacket. The protruding tab further has an edge adjacent to the free end of the flexural locking member, which is disposed substantially perpendicularly to the retainer major surface. The jacket is provided with a depression in communication with the interior portion of the jacket. The depression has an edge which is disposed substantially perpendicularly with respect to a major surface of the jacket. Arrival of the retainer at a fully inserted position in the jacket causes engagement of the perpendicularly disposed edges to preclude removal of the record retainer from the jacket during such an engagement. The free end of the flexural locking member is arranged in the path of an unlocking member disposed in the player, during insertion of the retainer/jacket assembly into the player, causing disengagement of the perpendicularly disposed edges to allow separation of the record retainer from the jacket.

In accordance with a further aspect of the invention, the record retainer is provided with an additional flexural locking member having a protruding element which is disposed on the opposite side of the retainer from the side having the first-mentioned protruding element. The jacket is provided with an additional depression for reception of the second-mentioned protruding element upon full insertion of the record retainer therein. An additional unlocking member is arranged in the path of the second-mentioned flexural locking member during insertion of the retainer/jacket assembly into the player, causing disengagement of the second-mentioned protruding element from the second-mentioned depression, to allow separation of the record retainer from the jacket. An advantage of this arrangement is that a jacket can be inserted into the player without regard to which face is upward for record retrieval. Also, the retainer/jacket assembly can be inserted into the player with either face upward to load a record into the player.

In the accompanying drawings:

FIGS. 3 and 4 depict parts of the aforesaid caddy unlocking mechanism incorporated in the player of FIG. 2;

FIGS. 5–7 illustrate the operation of the caddy locking and unlocking mechanisms on one side of the player of FIG. 2;

FIGS. 8–10 represent the operation of the caddy locking and unlocking mechanisms on the other side of the player of FIG. 2;

FIG. 11 depicts a lift plate provided in the player of FIG. 2, which supports the above-mentioned caddy unlocking mechanism and a record extracting apparatus;

FIGS. 12 and 13 illustrate the operation of the above-said record extracting apparatus; and FIGS. 14 and 15 diagrammatically show steps involved in the transfer of a record retained in the player from the lifting plate to the player turntable for rotation therewith.

Figure 1:
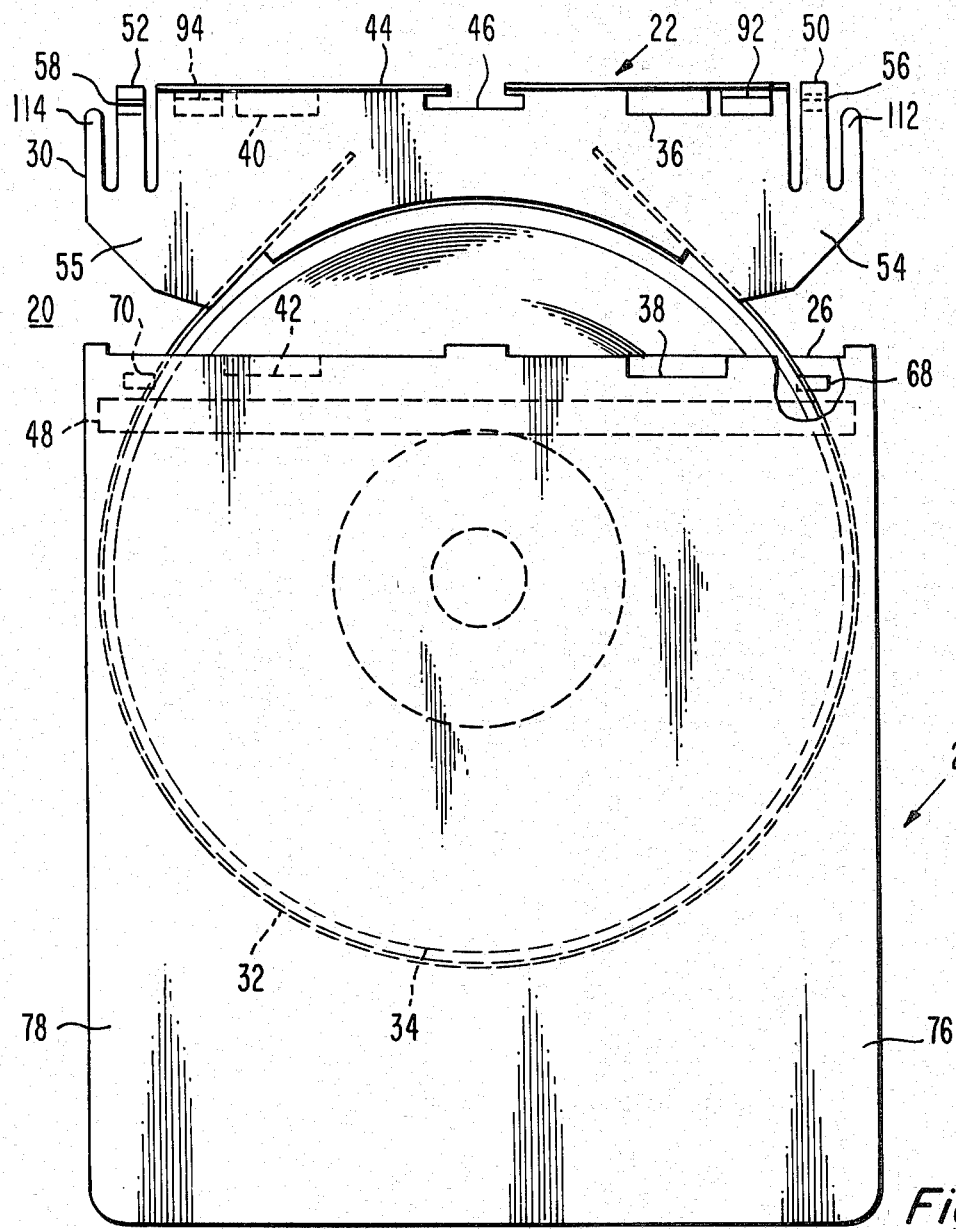
FIG. 1 shows a record caddy comprising a retainer and a jacket, and incorporating a locking mechanism in accordance with the principles of the instant invention.

Shown in FIG. 1 is a caddy 20 comprising a record retainer 22 and a jacket 24. The jacket 24 has an edge opening 26 in communication with a record enclosing cavity 28. The record retainer 22, which is removably received within the jacket 24, consists of a spine 30 and an annular portion 32 in the form of a strip having its ends secured to the spine. The annular portion 32 restrains planar movement of an enclosed record 34 relative to the retainer 22. A projecting portion 36 is disposed on the record retainer 22 bearing the record side identifying indicia (e.g., side 1). A cutout 38 is provided in the jacket 24 for receiving the projecting portion 36 upon insertion of the record retainer 22 into the jacket. Another set comprising a projecting portion 40, carrying the record side identifying indicia (e.g., side 2), and a cutout 42 is provided on the opposite side of the caddy, such that the record retainer 22 can be replaced in the jacket 24 without regard to relative orientation thereof. The record side identifying system of this type is disclosed in the U.S. patent application, Ser. No.

821,200, filed in behalf of F. R. Stave et al., on Aug. 2, 1977 now U.S. Pat. No. 4,138,703. The Stave et al. patent application is assigned to the same assignee as the assignee of the instant application.

The leading element 44 of the retainer spine 30 cooperates with the edge opening 26 of the jacket 24 to form a substantially sealed record enclosing cavity 28, when the record retainer is fully inserted within the jacket. The leading element 44 is provided with a hole 46 for receiving record extracting jaws arranged in the player in the manner to be subsequently described. A pair of wiping pads 48 are affixed to the upper and lower interior surfaces of the jacket 24 adjoining the edge opening 26 to clean the record during its passage to and from the record enclosing cavity 28 and to prevent dust and debris from entering into the record enclosing cavity.

The spine 30 and the jacket halves can be advantageously made from suitable plastic (e.g., 10–12% fiberglass-filled polystyrene) by a conventional process, such as injection molding. The strip 32, in the form of a piece of wire, can be secured to the spine 30 by insert molding its ends into the body of the spine. The jacket halves can be secured to each other by any suitable process, such as ultrasonic welding.

In accordance with the principles of the present invention, the record retainer 22 is provided with a pair of integrally molded, flexural locking members 50 and 52, which are equispaced from the centerline of the spine 30, and which have free ends which are adapted for deflection in a direction perpendicular to a pair of parallel, major surfaces 54 and 55 of the spine. Respective protruding elements 56 and 58 are disposed on the opposite sides of the spine 30, adjacent to the free ends of the respective flexural locking members 50 and 52, as shown in FIGS. 1, 5 and 8. The respective protruding elements 56 and 58 have edges 60 and 62, remote from the free ends of the respective flexural locking members 50 and 52, which are disposed obtusely with respect to the major surfaces of the spine 30, as shown in FIGS. 5–7 and 8–10. The obtusely disposed edges 60 and 62 of the protruding elements 56 and 58 engage the respective interior surfaces of the jacket 24 to cause deflection of the flexural locking members 50 and 52 during insertion of the record retainer 22 into the jacket. The respective protruding elements 56 and 58 have further edges 64 and 66, adjacent to the free ends of the respective flexural locking members 50 and 52, which are disposed perpendicularly relative to the major surfaces of the spine 30, in the manner illustrated in FIGS. 5–7 and 8–10.

The spine 30 is further provided with guard members 112 and 114 (FIGS. 1, 5 and 8) for protecting the flexural locking members 50 and 52.

The jacket 24 is provided with a pair of depressions 68 and 70 for releasably receiving the respective protruding elements 56 and 58 upon arrival of the record retainer 22 at a fully inserted position in the jacket, as illustrated in FIGS. 6 and 9. The depressions 68 and 70 define edges 72 and 74, adjacent to the edge opening 26 in the jacket 24, which are disposed substantially perpendicularly to the major surfaces 76 and 78 of the jacket for engagement with the perpendicularly disposed edges 64 and 66 of the flexural locking members 50 and 52 to preclude removal of the record retainer 22 from the jacket during the aforementioned engagement.

The free ends of the flexural locking members 50 and 52 are arranged in the path of respective unlocking members 80 and 82 (as shown, respectively, in FIGS. 3, 5 and 7 and 4, 8 and 10) during insertion of the caddy into the player for causing disengagement between the respective, perpendicularly disposed edges, as illustrated in FIGS. 7 and 10, to allow separation of the record retainer 22 from the jacket. As shown in FIG. 11, a lift plate 96 is disposed in the player for supporting the caddy unlocking members 80 and 82. The operation of the lift plate 96 will be later explained in conjunction with FIGS. 12–14. The unlocking members 80 and 82 have slanting surfaces 84 and 86 which are inclined in the opposite directions relative to the direction of caddy insertion to, respectively, cause the flexural locking members 50 and 52 to be oppositely deflected in order to dislodge the protruding elements 56 and 58 from the respective depressions 68 and 70 in the jacket 24.

A pair of hold-down members 88 and 90 are arranged in the player near the unlocking members 80 and 82, as shown in FIGS. 3 and 4, to assure proper lateral and vertical alignment of the spine 30 in the player. The hold-down member 88 is seated in a recess 92 (see FIGS. 1 and 5) provided in the spine 30, when the caddy is fully inserted into the player. Another recess 94 is provided on the opposite side of the spine 30 to receive the hold-down member 88, when the caddy is inserted into the player with its opposite side facing upward. The recess 94 can be seen in FIGS. 1 and 8. The hold-down member 90 engages the top surface of the spine 30 and the jacket 24 in the manner shown in FIG. 10.

Because the flexural locking members of the spine, depressions in the jacket and the unlocking members of the player are symmetrically disposed about the direction of insertion, it will be seen that either the empty jacket or the record occupied caddy can be inserted with either face upward, and the locking and unlocking mechanisms will work satisfactorily.

Figure 2:
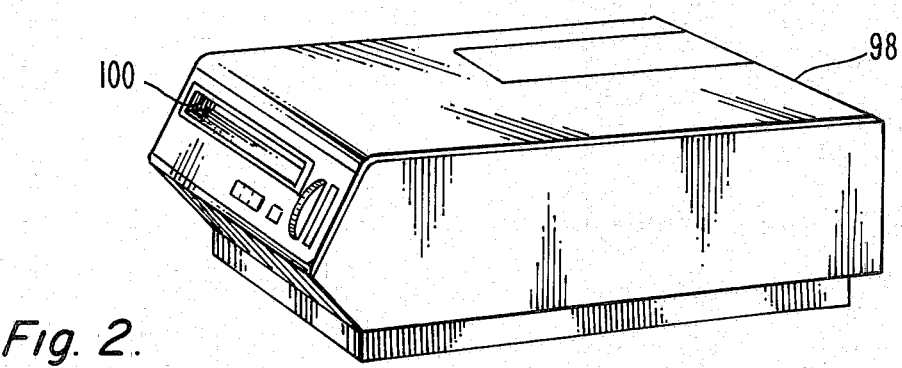
FIG. 2 illustrates a player incorporating a caddy unlocking mechanism, also pursuant to the subject invention, suitable for use with the caddy of FIG. 1.

The operation of the rest of the player mechanism will now be explained with the aid of FIGS. 2 and 11–15. FIG. 2 shows a video disc player 98 (e.g., of the type described in U.S. Pat. No. 3,842,194, issued to Clemens) which has an input slot 100 disposed at the front end thereof. To load a record into the player, a caddy is inserted through the input slot 100. The lift plate 96 (FIG. 11) is mounted in the player for motion between an elevated position (FIG. 14) and a depressed position (FIG. 15). The lift plate 96 is provided with tracks (not shown) which are aligned with the input slot 100, when the lift plate is in the elevated position, for guiding insertion of the caddy into the player. A record extracting apparatus 102 (FIGS. 14 and 15) is mounted on the lift plate 96 at a location indicated by 104 in FIG. 11. As shown in FIG. 12, the record extracting apparatus 102 includes a pair of jaws 106 and 108, which are received in the hold 46 disposed in the spine 30 during insertion of the caddy into the player. Upon arrival of the caddy at the fully inserted position in the player, the jaws 106 and 108 open up to latch the spine 30 to the lift plate 96 in the manner shown in FIG. 13. Subsequent withdrawal of the jacket from the player, leaves the record and the retainer in the player resting on the lift plate 96 as shown in FIG. 14. When the lift plate 96 is depressed, the retained record is transferred to the turntable 110 for rotation therewith. When an empty jacket is inserted into the player for record retrieval after playback, the above steps are repeated in a reverse sequence. The jaws 106 and 108 of the record extracting mechanism 102 are indexed to release the spine 30 from the lift plate 96. As the caddy is withdrawn from the player, the flexural locking members 50 and 52 return the protruding elements 56 and 58 thereon to the depressions 68 and 70 in the jacket to lock the retainer to the jacket.

What is claimed is:

1. A protective cover for a disc record for use with a record player having an unlocking member; said cover comprising:

(A) a jacket having an edge opening in communication with a record enclosing cavity; and (B) a record retainer removably received within said jacket and having a major surface; said retainer being adapted to cooperate with the edge opening of said jacket to form a substantially sealed record enclosing cavity, and having a configuration for restraining planar movement of an enclosed record relative to said retainer;

said retainer being provided with an integrally molded, flexural locking member having a free end which is subject to deflection in a direction at right angles to said major surface of said retainer;

a protruding element being disposed on said flexural locking member near said free end thereof, and having an edge remote from said free end which is disposed obtusely relative to said major surface of said retainer such that engagement between said obtusely disposed edge and an interior surface of said jacket causes deflection of said flexural locking member to permit insertion of said retainer into said jacket;

said protruding element further having an edge adjacent to said free end of said flexural locking member, which is disposed substantially perpendicularly to said major surface of said retainer;

said jacket being provided with a portion defining a substantially perpendicular edge adjacent to said edge opening of said jacket for engagement with said perpendicularly disposed edge of said flexural locking member upon arrival of said retainer at a fully inserted position in said jacket to preclude removal of said retainer from said jacket during said engagement between said perpendicular edges of said retainer and said jacket;

said free end of said flexural locking member being adapted for arrival in the path of said player unlocking member during insertion of said cover into said player for causing disengagement between said retainer perpendicular edge and said jacket perpendicular edge to permit subsequent separation of said retainer from said jacket.

2. A cover as defined in claim 1 wherein said portion of said jacket defining said substantially perpendicular edge comprises a depression in communication with the interior of said jacket.

3. A cover as defined in claim 1 wherein said retainer is provided with an additional, integrally molded flexural locking member having a free end which is also subject to deflection in a direction at right angles to said retainer major surface, and which is disposed such that said respective free ends are equispaced from the centerline of said retainer; said additional flexural locking member having, adjacent to said free end thereof, a protruding element which is disposed on the opposite side of said retainer from the side having said first-mentioned protruding element; said second-mentioned protruding element having an obtusely disposed edge remote from said free end thereof, and which is disposed such that engagement thereof with an interior surface of said jacket causes deflection of said additional flexural locking member to allow entry of said retainer into said jacket; said second-mentioned protruding element further having a substantially perpendicularly disposed edge adjacent to said free end of said additional flexural locking member;

said jacket being provided with an additional portion defining a substantially perpendicular edge adjacent to said edge opening thereof for engagement with said perpendicularly disposed edge of said additional flexural locking member upon full insertion of said retainer into said jacket to preclude removal of said retainer from said jacket during said engagement between said perpendicularly disposed edges of said additional flexural locking member and said additional jacket portion; and said free end of said additional flexural locking member being arranged in the path of an additional unlocking member provided in said player during insertion of said cover into said player for causing disengagement between said perpendicularly disposed edges of said additional flexural locking member and said additional jacket portion to allow separation of said retainer from said jacket.

4. A cover as defined in claim 3 wherein said portions of said jacket defining said substantially perpendicular edges comprise depressions in communication with the interior of said jacket.

* * * * *